United States Patent [19]
Vuletic

[11] Patent Number: 4,784,689
[45] Date of Patent: Nov. 15, 1988

[54] PROCESS FOR PRODUCING SPONGE IRON PARTICLES AND MOLTEN PIG IRON

[75] Inventor: Bogdan Vuletic, Düsseldorf, Fed. Rep. of Germany

[73] Assignee: Korf Engineering GmbH, Fed. Rep. of Germany

[21] Appl. No.: 826,323

[22] Filed: Feb. 5, 1986

[30] Foreign Application Priority Data

Feb. 6, 1985 [DE] Fed. Rep. of Germany ....... 3504346

[51] Int. Cl.$^4$ ............................................. C21B 13/06
[52] U.S. Cl. ........................................ 75/38; 266/160; 75/34
[58] Field of Search ................... 75/38, 34, 35; 209/3, 209/10, 142, 139.1; 266/160

[56] References Cited

U.S. PATENT DOCUMENTS 4,299,694 11/1981 Goodell ............................ 209/139.1
4,543,123 9/1985 Vuletic ..................................... 75/38

Primary Examiner—Melvyn J. Andrews

[57] ABSTRACT

In this process for the direct production of sponge iron particles and molten pig iron from lump iron ore, which is reduced in a direct reduction unit (2) and supplied in the hot state to a melt-down gasifier (1), the sponge iron particles discharged from the direct reduction unit are separated into a fine particle fraction and a coarse particle fraction and only the former is supplied to the melt-down gasifier. Separation takes place in an air classifier (7) connected to the discharge means of the direct reduction unit and through said classifier flows cooling gas at a predetermined velocity in countercurrent to the sponge iron particles. This cooling gas is admixed with the reducing gas produced in the melt-down gasifier for the direct reduction unit and said gas mixture, as well as the fine particle fraction of the sponge iron entrained therewith are supplied to cyclones (5 and 6). The solid separated therein, e.i., the fine particle fraction and the coke particles, are introduced into the melt-down gasifier level with the coal fluidized bed. The gas mixture freed from the solids is used as a reducing gas in the direct reduction unit. Part is branched therefrom beforehand, washed and compressed and used as a cooling gas. The coarse particle fraction passes out of the air classifier into a cooling or buffer unit (4) and is then discharged therefrom.

21 Claims, 1 Drawing Sheet

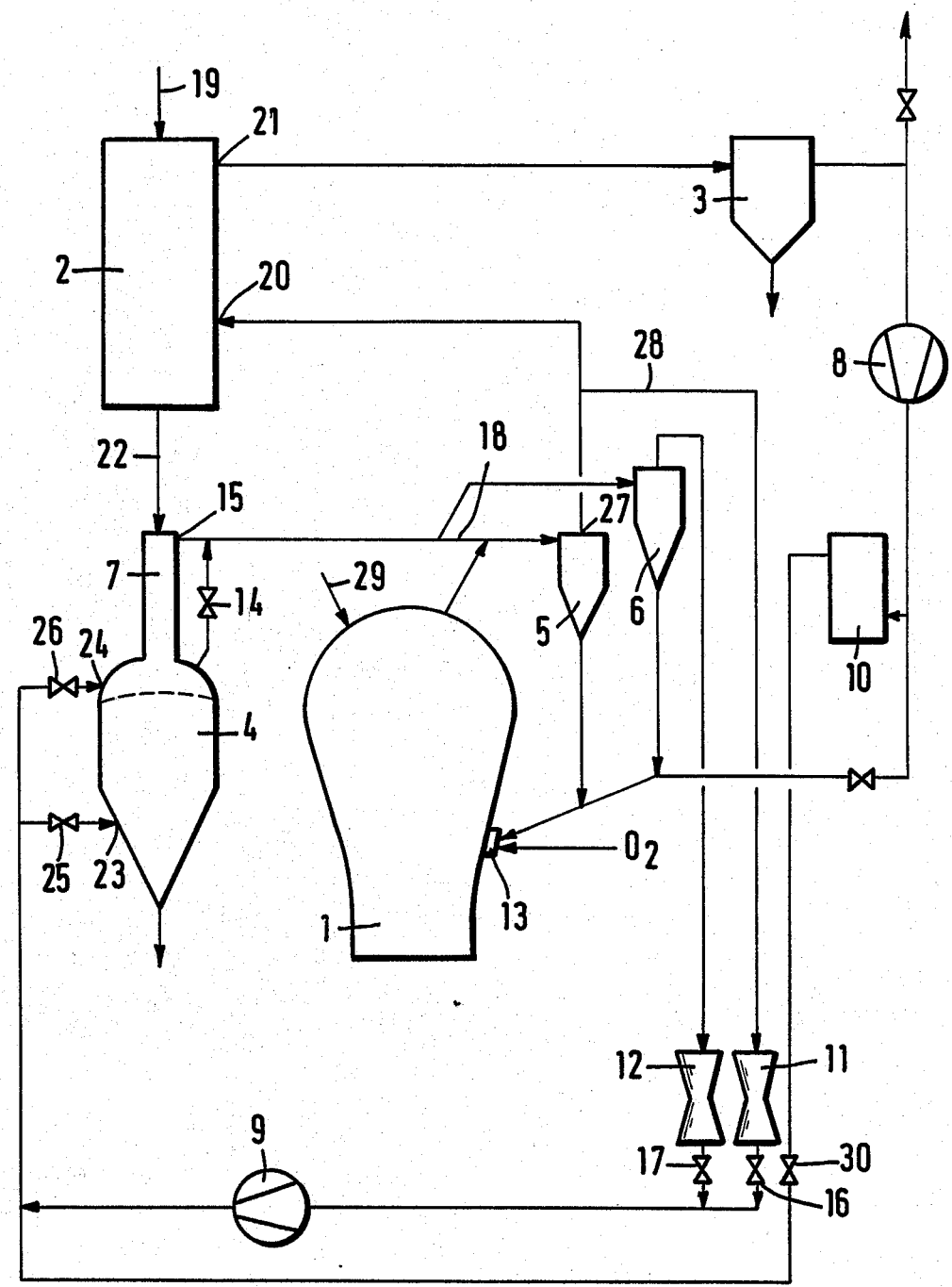

PROCESS FOR PRODUCING SPONGE IRON PARTICLES AND MOLTEN PIG IRON

The invention relates to a process for producing sponge iron particles and molten pig iron from lump iron ore, in which the iron ore is reduced in a direct reduction unit by means of reducing gas to sponge iron and the sponge iron particles discharged from the direct reduction unit are separated into a fine particle fraction and a coarse particle fraction, whereby the fine particle fraction is fed to a melt-down gasifier, in which from introduced coal and blown-in oxygen-containing gas is produced the heat necessary for melting the fine particle fraction of the sponge iron, together with reducing gas, whereof at least part is introduced into the direct reduction unit.

The invention also relates to an apparatus for performing this process.

A process of the aforementioned type is known from DE-OS No. 3,328,373. This process is based on the fact that on introducing the complete sponge iron into the melt-down gasifier more reducing gas is produced during its melting down than is required for reducing the iron ore for producing the same sponge iron quantity. This is particularly the case with coals having a high content of volatile material. In order to utilize the excess reducing gas, it is therefore necessary to couple the pig iron production plant with other plants requiring energy in the form of reducing gas. However, this can lead to technical difficulties and is often not economically appropriate. Another reason for using the known process is that in many steel mills there is free capacity for melting down sponge iron.

The separated coarse particle fraction of the sponge iron is further processed in known manner, i.e. it can either be fed in the hot state to a further melt-down vessel, e.g. an arc furnace or it can be hot briquetted, passivated or cooled, so that it is available as a charge for a smelting furnace.

In the known process a coarse particle separator is introduced into the connecting line between the direct reduction unit and the melt down gasifier, whose outlet for the fine particle fraction is connected to the melt-down gasifier and whose outlet for the coarse particle fraction is connected to a separate melt-down unit or with an apparatus for hot briquetting, hot compacting, passivating or cooling. The coarse particle separator is in the form of a sloping chute with at least one connecting piece branching downwards therefrom, in which the fine particles are deposited at the bottom during the conveying of the bulk material and can be removed in dosed manner by means of the connecting piece, whilst the coarse particles are passed on. In another construction, the coarse particle separator has a thermally loadable screen or a grid.

The coarse particle separator used in a known process suffers from certain disadvantages. Thus, it cannot be adapted to different operating conditions, e.g. if the quantity ratio between the fine particle fraction or coarse particle fraction is to be changed or if the mean particle size of the sponge iron is to be modified. In addition, in the case of the coarse particle separator in the form of a sloping chute, a clean separation of fine and coarse particle fractions is not possible. There is also a risc of sticking of the sponge iron particles and when using a screen for separating said particles its mesh width can change, in that the hot sponge iron, which has a sticking tedency, adheres to the meshes.

It is therefore the problem of the present invention to so develop a process of the aforementioned type that a very accurate separation between the fine and coarse particle fractions can be carried out and that the quantity ratio between the fine and coarse particle fractions can be adjusted in a simple and very accurate manner.

According to the invention this problem is solved in that the sponge iron particles discharged from the direct reduction unit are introduced into an air classifier for separating into the fine and coarse particle fractions, whereby through said air classifier cooling gas flows at a predetermined velocity in countercurrent to the sponge iron particles, that part of the cooling gas flow is coarsely dedusted in a cyclone and is reused as a cooling gas after washing, cooling and compression, that the other part is admixed with a reducing gas produced in the melt-down gasifier, that the mixture of reducing and cooling gas and the fine particle fraction entrained therewith are fed to a cyclone and the gas mixture free from the fine particle fraction is fed into the direct reduction unit, that the fine particle fraction separated in the cyclones is blown into the melt-down gasifier and that the coarse particle fraction from the air classifier is discharged via a buffer unit.

preferably the gas velocity in the air classifier is chosen in such a way that the fine particle fraction contains sponge iron particles up to a size of approximately 5 mm. The size of the separated particles is also a function of the desired sulphur content of the discharged sponge iron.

Due to the weight-related larger surface of the fine sponge iron particles, the fine particle fraction binds a larger proportion of the sulphur in the reducing gas than the coarse particle fraction.

The gas velocity in the air classifier or the size of the discharged particles is adjusted by the cooling gas quantity and with the aid of a regulating fitting installed in the bypass to the air classifier. The setting of the reducing gas temperature takes place independently thereof and namely by branching of part of the cooling gas preheated in the buffer unit and air classifier and the admixing thereof with the reducing gas from the melt-down gasifier. This gas quantity branched from the cooling gas circuit is replaced in plants with $CO_2$ washer by the prepared blast furnace gas and in plants without such a washer by the reducing gas. Prior to entering the air classifier, the cooling gas is used for cooling the separated coarse particle fraction of the sponge iron. If the coarse particle fraction is to be discharged hot, e.g. for hot briquetting, then the cooling gas is advantageously blown in above the coarse particle fraction collecting in a buffer unit and it is preferably additionally preheated. The fine particle fraction of the cooling gas and the reducing dust are separated in cyclones and with the aid of the $CO_2$-containing blast furnace gas blown via dust burners into the melt-down gasifier.

In the case of the process according to the invention, the complete sponge iron particle quantity produced in the direct reduction unit is not supplied to the melt-down gasifier and instead only part thereof is supplied, so that on melting down said part an excess of heat is present in the gasifier. As a result it is possible to replace part of the oxygen by $CO_2$-containing blast furnace gas of the reduction unit and a part of the coal can be gasified by endothermic reactions with said gas.

In the apparatus for performing the present process, the direct reduction unit is arranged above the melt-down gasifier and is provided at the lower end with a discharge means for the hot sponge iron, to which is connected an air classifier and which has an upper outlet for the fine particle fraction for connection to the cyclones and a lower outlet for the coarse particle fraction for connection to the cooling or buffer unit.

BRIEF DESCRIPTION OF THE DRAWINGS

The invention is described herein after relative to an embodiment shown in the single FIGURE of drawing, which diagrammatically represents a plant for producing sponge iron particles and molten pig iron from lump iron ore.

DESCRIPTION OF PREFERRED EMBODIMENTS

The plant contains a melt-down gasifier above which is arranged a direct reduction shaft furnace 2. From above lump iron ore is fed to the shaft furnace 2, as indicated by arrow 19 and drops in the form of a loosely packed bed into said furnace and is reduced to sponge iron by means of a hot reducing gas at a temperature of approximately 750° to 900° C. blown in via a gas inlet 20. The reducing gas consumed leaves the shaft furnace 2 via an upper gas outlet 21 in the form of waste gas.

The hot sponge iron produced through the reduction of the lump iron ore is discharged from the bottom of the shaft furnace 2 at a temperature of approximately 750° to 850° C. and passes via a pipe 22 into an air classifier 7 used for separating the sponge iron particles into a fine particle fraction and a coarse particle fraction. At its lower end, pipe 22 is bent or has some other decelerating means, so that the sponge iron passes at a minimum speed and in well distributed manner into air classifier 7. To the latter is connected a cooling or buffer unit 4 for the coarse particle fraction of the sponge iron. Cooling gas is blown into the unit either via a lower gas inlet 23 or an upper gas inlet 24. Valves 25 and 26 are provided for choosing either gas inlet 23 or gas inlet 24. The cooling gas blown into the cooling or buffer unit flows upwards into air classifier 7. It meets in counter flow the sponge iron particles introduced via pipe 22. The velocity of the cooling gas in air classifier 7 is adjusted by the throttle fitting 14. This velocity can be varied without difficulty in a wide range. It essentially determines the quantity ratio of fine particle fraction to coarse particle fraction of the separated sponge iron particles.

The gas leaving gas outlet 14 carries with it part of the coke and sponge iron particles introduced via pipe 22 into air classifier 7 and specifically the fine particle fraction. The maximum size of the fine particle fraction is determined by the cooling gas flow rate. As stated, the latter can be adjusted without difficulty to a desired value.

Part of the cooling gas from air classifier 7 is branched via line 18, coarsely dedusted in cyclone 6, washed and cooled in washer 12, compressed by blower 9 and reused as cooling gas. The remaining quantity is admixed with the reducing gas from melt-down gasifier 1, in order to set the necessary temperature for reduction unit 2. The same quantity can also be obtained from the gas flowing through the cyclone 5. For this purpose, behind gas outlet 27 is provided a branch line 28 via which it is possible to remove part of the reducing gas leaving cyclone 5. This gas is washed, compressed and blown into unit 4 as cooling gas. The setting of the individual quantities takes place by means of regulating fitting 16 and 17.

In the case of blast furnace gas preparation with the aid of a cyclone 3, a blower 8 and a $CO_2$ washer 10, the cooling gas quantity branched via pipe 18 from the cooling gas circuit can be set through the prepared blast furnace gas with the aid of regulating fitting 30.

The mixture of reducing and cooling gas is passed to cyclone 5, in which the coarser particles are separated from the gas.

These solids essentially comprise the fine particle fraction of the sponge iron and coke particles entrained with the gas produced in the melt-down gasifier. The discharge from cyclones 5 and 6 is then blown via one or more dust burners 13 into the melt-down gasifier 1, preferably above the fluidized bed with the aid of the compressed blast furnace gas, which simultaneously serves as the transport gas for the solids. Simultaneously with the dust, the dust burner also blows in oxygen.

The reducing gas freed from the solids is fed from gas outlet 27 of cyclone 5 to gas inlet 20 of shaft furnace 2.

The coal quantity required for forming and maintaining a coal fluidized bed in melt-down gasifier 1 is directly supplied thereto via a pipe 29. The per se known melt-down gasifier can be subdivided into three portions in the operating state, namely into a lower portion containing molten pig iron and slag, a central portion containing the coal fluidized bed and a further upper portion serving as a deoxidizing zone. Due to the fact that the fine particle fraction of the sponge iron is not introduced from above into gasifier 1, but is instead introduced via lateral inlet 17 at the level of the coal fluidized bed, it is possible to considerably reduce the fine particle quantity discharged again with the gas produced in the melt-down gasifier. In its lower-region, gasifier 1 has not shown openings for the taping of molten pig iron and slag. The gas produced by gasifying coal with the oxygen-containing gas in the melt-down gasifier essentially consists of CO and possibly $H_2$, so that is is eminently suitable as reducing gas.

The coarse particle fraction separated from the fine particle fraction of the sponge iron passes out of air classifier 7 into the cooling or buffer unit 4 counter to the cooling gas flow. In unit 4 are collected the sponge iron particles of the coarse particle fraction, which are preferably larger than 5 mm and are optionally cooled. They are discharged via an outlet either in the hot or cooled state. If the coarse particle fraction is to be cooled prior to discharge, then the cooling gas is blown via the lower inlet 23 into unit 4, so that it flows through the coarse particle fraction and cools the same. However, if the coarse particle fraction is to be discharged hot, then the cooling gas is blown in via the upper gas inlet 24. This is located above the sponge iron particles collected in unit 4, so that the temperature thereof is hardly influenced by the cooling gas. In this case, preheating thereof is also possible.

I claim:

1. A process for producing sponge iron particles and molten pig iron from lump iron ore comprising the steps of reducing the iron ore to sponge iron in a direct reduction unit by introducing the lump iron ore and a reducing gas into said direct reduction unit, discharging the sponge iron particles from said reduction unit and introducing same into an air separator, separating said sponge iron in said separator into a sponge iron fine particle fraction and a sponge iron coarse particle fraction, feeding the fine particle fraction to a melt-down gasifier, introducing coal and blown-in oxygen-containing gas into said melt-down gasifier to produce said reducing gas as well as the heat necessary for melting the fine particle fraction of the sponge iron, and introducing at least a part of said reducing gas into the direct reduction unit.

2. The process defined in claim 1 wherein the steps further comprise feeding the sponge iron fine particles and the sponge iron coarse particles being discharged from the direct reduction unit to the air separator in a feed direction and feeding cooling gas to the air separator in a direction counter to the feed direction.

3. The process defined in claim 2 wherein the steps further include varying the rate at which cooling gas is fed to the separator.

4. The process defined in claim 3 wherein the steps further includes sending the coarse particles to a cooling unit and cooling the sponge iron coarse particles prior to discharging those coarse iron particles from the cooling unit.

5. The process defined in claim 4 in which the cooling gas flow direction is directly counter the feed direction for essentially the entire axial length of the air separator.

6. The process defined in claim 5 wherein the steps further include discharging the sponge iron fine particles from the air separator to one location, discharging sponge iron coarse particles from the air separator to another location, separating a portion of the coarse particles being discharged from the air separator and adding that portion back to the fine particles being discharged from the air separator.

7. Process according to claim 2, wherein the steps further include dividing the cooling gas into a plurality of parts, producing reducing gas in a melt-down gasifier, with part of the cooling gas flow being coarsely dedusted in a first cyclone washed, cooled and compressed and is then used as cooling gas again, another part of the cooling gas being admixed with reducing gas produced in a melt-down gasifier, feeding the mixture of reducing gas and cooling gas and the fine particle fraction entrained by the same to a second cyclone feeding the gas mixture free from the fine particle fraction into the direct reduction unit and blowing the fine particle fraction separated in the first and second cyclones into the melt-down gasifier.

8. Process according to claim 7, further including using a buffer unit to discharge the coarse particle fraction from the air separator.

9. Process according to claim 8, further including discharging the coarse particle fraction of the sponge iron out of the air separator and then cooling that fraction in the buffer unit after passing out of the air classifier.

10. Process according to claim 8 further including discharging the coarse particle fraction of the sponge iron from the buffer unit in a hot condition and is subsequently hot compacted.

11. Process according to claim 10, further including a step of adjusting the gas velocity in the air separator so that the fine particle fraction contains sponge iron particles up a size of approximately 5 mm.

12. Process according to claim 11, further including using the cooling gas for cooling the coarse particle fraction of the sponge iron prior to that cooling gas entering the air separator.

13. Process according to claim 12, further including removing part of the cooling gas from the air separator, dedusting washing, cooling and compressing that removed gas in a cyclone and using such gas as a cooling gas for cooling the coarse particle fraction of the sponge iron.

14. Process according to claim 13, including admixing part of the cooling gas from the air separator with the reducing gas from the melt-down gasifier.

15. Process according to claim 14, further including branching part of the cooling gas from the cooling gas circuit and replacing that branched gas part by the blast furnace gas prepared in a $CO_2$ washer.

16. Process according to claim 15, further including washing and cooling part of the reducing gas and then compressing and using such gas as a cooling gas.

17. Process according to claim 16, further including adjusting the quantity of cooling gas supplied to the buffer unit to adjust the gas velocity in the air separator.

18. Process according to claim 17, further including using a regulating fitting to adjust the quantity of cooling as supplied to the buffer unit.

19. Process according to claim 18, further including using at least one dust burner to move fine particles from the cyclones to the melt-down gasifier.

20. Process according to claim 19, further including discharging waste gas from the direct reduction unit, washing, compressing and cooling that waste gas and then blowing such gas into the melt-down gasifier.

21. Process according to claim 11, wherein the cooling gas is blown above the collected coarse particle fraction of the sponge iron into the buffer unit.

* * * * *